United States Patent [19]
Brooks

[11] Patent Number: 5,831,607
[45] Date of Patent: Nov. 3, 1998

[54] METHOD FOR ADAPTING MULTIPLE SCREENS OF INFORMATION FOR ACCESS AND USE ON A SINGLE GRAPHICAL PANEL IN A COMPUTER SYSTEM

[75] Inventor: Arthur Phillip Brooks, Oronoco, Minn.

[73] Assignee: International Business Machines Corporation, Armonk, N.Y.

[21] Appl. No.: 591,845

[22] Filed: Jan. 25, 1996

[51] Int. Cl.[6] .................................................. G06F 3/00
[52] U.S. Cl. ......................................................... 345/333
[58] Field of Search ..................... 395/155, 156, 395/157, 161; 345/326, 333, 334, 339

[56] References Cited

U.S. PATENT DOCUMENTS

| | | | |
|---|---|---|---|
| 4,739,477 | 4/1988 | Barker et al. | 707/100 |
| 4,908,612 | 3/1990 | Bromley et al. | 345/159 |
| 4,912,650 | 3/1990 | Tanaka et al. | 395/99 |
| 4,933,514 | 6/1990 | Bowers | 379/6 |
| 5,050,116 | 9/1991 | Stahnke | 364/709.15 |
| 5,086,503 | 2/1992 | Chung et al. | 341/22 |
| 5,086,513 | 2/1992 | Lawrence et al. | 455/186.1 |
| 5,121,477 | 6/1992 | Koopmans et al. | 345/333 |
| 5,179,652 | 1/1993 | Rozmanith et al. | 345/331 |
| 5,408,603 | 4/1995 | Van de Lavoir et al. | 345/349 |
| 5,421,008 | 5/1995 | Banning et al. | 707/4 |
| 5,437,014 | 7/1995 | Busboom et al. | 345/329 |

OTHER PUBLICATIONS

"Software Development Tools has Automatic Screen Builder," Computergram International, (19 Sep. 1995) No. 2752.

Chi–Hwa,"Windows User Interface to Data Retrieval and Report Generation for a Diabetic Patient Database," 1994 IEEE 7th Symp. on Computer –Based Medical Systems, Jun. 1994.

"Third Parties," Report on IBM, Aug. 23, 1995, vol. 12, No. 34.

"Rumba (R) Express Makes 'Instant Windows' Out of Legacy Host Applications," PR Newswire, Oct. 17, 1995.

*Primary Examiner*—A. Katbab
*Attorney, Agent, or Firm*—Felsman, Bradley, Gunter & Dillon, LLP

[57] ABSTRACT

A screen conversion mechanism is disclosed that converts character-based data information from multiple screens to graphical-based data information for display in a single graphical panel. The screen conversion mechanism allows the functions and options available in character-based applications, typically located on a host system and often across several screens, to be converted on the fly for display on graphical-based user terminal. The single graphical panel allows the user to access all functions or options.

32 Claims, 10 Drawing Sheets

```
Session B [24 x 80]                                    ☐□⊠
                                                             R
                       Work with Active Jobs         12/12/95    RCHASD1F
                                                                 13:22:16
CPU %:    .0   Elapsed time:    00:00:00   Active jobs:    95

Type options, press Enter.
  2=Change  3=Hold  4=End  5=Work with  6=Release  7=Display message
  8=Work with spooled files  13=Disconnect...

Opt  Subsystem/Job   User      Type   CPU %   Function           Status
     QBATCH          QSYS      SBS      .0                       DEQW
     QCMN            QSYS      SBS      .0                       DEQW
     DAW1            DAW       EVK      .0    *-PASSTHRU         EVTW
     OKEEFE          OKEEFE    EVK      .0    *-PASSTHRU         EVTW
     QCTL            QSYS      SBS      .0                       DEQW
     QPFRCOL         QPGMR     ASJ      .0    PGM-QPMLWAIT       EVTW
     QSYSSCD         QPGMR     BCH      .0    PGM-QEZSCNEP       EVTW
     QINTER          QSYS      SBS      .0                       DEQW
     OKEEFEGO        OKEEFE    INT      .0    CMD-TELNET         DEQW
                                                                  More....

Parameters or command
===>
 F3=Exit  F5=Refresh  F10=Restart statistics  F11=Display elapsed data
 F12=Cancel  F23=More options  F24=More keys
```

Fig. 3A

```
Session B [24 x 80]                                              _ □ X
                                                                    ╲
                        Work with Active Jobs                       302
                                                            RCHASD1F
                                                   12/12/95 13:22:16
CPU %:    .0    Elapsed time:   00:00:00    Active jobs: 95
                                                         ╲
Type options, press Enter.                               306
  9=Exclude   10=Display call stack   11=Work with locks
 14=Work with mutexes Opt  Subsystem/Job  User     Type  CPU %  Function        Status
     QBATCH         QSYS     SBS     .0                   DEQW
     QCMN           QSYS     SBS     .0                   DEQW
       DAW1         DAW      EVK     .0                   EVTW
       OKEEFE       OKEEFE   EVK     .0                   EVTW
     QCTL           QSYS     SBS     .0                   DEQW
     QPFRCOL        QPGMR    ASJ     .0  *-PASSTHRU       EVTW
     QSYSSCD        QPGMR    BCH     .0  *-PASSTHRU       EVTW
     QINTER         QSYS     SBS     .0  PGM-QPMLWAIT     DEQW
       OKEEFEGO     OKEEFE   INT     .0  PGM-QEZSCNEP     DEQW
                                        CMD-TELNET
                                                               More...
Parameters or command
===>
 F3=Exit  F5=Refresh  F10=Restart statistics  F11=Display elapsed data
 F12=Cancel  F23=More options  F24=More keys
╲
304
```

*Fig. 3B*

```
Session B [24 x 80]                                              RCHASD1F
                       Work with Active Jobs                12/12/95 13:22:16
CPU %:    .0    Elapsed time:  00:00:00    Active jobs:  95

Type options, press Enter.
  9=Exclude  10=Display call stack  11=Work with locks
 14=Work with mutexes Opt  Subsystem/Job   User      Type  CPU %   Function         Status
     QBATCH          QSYS      SBS      .0                    DEQW
     QCMN            QSYS      SBS      .0                    DEQW
       DAW1          DAW       EVK      .0                    EVTW
       OKEEFE        OKEEFE    EVK      .0                    EVTW
     QCTL            QSYS      SBS      .0                    DEQW
       QPFRCOL       QPGMR     ASJ      .0   *-PASSTHRU       EVTW
       QSYSSCD       QPGMR     BCH      .0   *-PASSTHRU       EVTW
     QINTER          QSYS      SBS      .0   PGM-QPMLWAIT     DEQW
                                            PGM-QEZSCNEP     DEQW
       OKEEFEGO      OKEEFE    INT      .0   CMD-TELNET
                                                                 More...

Parameters or command
===>
F4=Prompt  F9=Retrieve  F13=Reset statistics  F14=Include
F15=Work with system status  F16=Resequence  F24=More keys
```

Fig. 3C

```
Session B [24 x 80]                                                    _ □ ×
                                                                RCHASD1F
                          Work with Active Jobs          12/12/95  13:22:16
CPU %:    .0    Elapsed time:   00:00:00    Active jobs:    95
                                                       306
Type options, press Enter.
  9=Exclude  10=Display call stack  11=Work with locks
 14=Work with mutexes Opt  Subsystem/Job   User      Type  CPU %   Function           Status
     QBATCH          QSYS      SBS     .0                       DEQW
     QCMN            QSYS      SBS     .0                       DEQW
       DAW1          DAW       EVK     .0                       EVTW
       OKEEFE        OKEEFE    EVK     .0                       EVTW
     QCTL            QSYS      SBS     .0                       DEQW
       QPFRCOL       QPGMR     ASJ     .0    *-PASSTHRU         EVTW
       QSYSSCD       QPGMR     BCH     .0    *-PASSTHRU         EVTW
     QINTER          QSYS      SBS     .0    PGM-QPMLWAIT       DEQW
       OKEEFEGO      OKEEFE    INT     .0    PGM-QEZSCNEP       DEQW
                                            CMD-TELNET
                                                                    More...
Parameters or command
===>
F21=Nondisplay instructions/keys  F24=More keys
                                            304
```

Fig. 3D

METHOD FOR ADAPTING MULTIPLE SCREENS OF INFORMATION FOR ACCESS AND USE ON A SINGLE GRAPHICAL PANEL IN A COMPUTER SYSTEM

BACKGROUND OF THE INVENTION

1. Technical Field

The present invention relates generally to data processing systems using graphical displays and software and, more particularly, to program information and commands usable by a user in a data processing system having a graphical display.

2. Description of the Prior Art

Computer technology has advanced greatly since the early days of computer systems developed shortly after World War II. Computer systems are now found and used in most all businesses and in many homes. Computers have become quite useful in businesses and homes in that they perform a variety of tasks in an efficient manner. Typically, a computer system is defined by two separate groups, namely, computer hardware and computer software.

Computer hardware is directed towards the physical components of a computer system such as, for example, the display screen, the central processing unit box, the hard disk drive on which long-term storage is maintained, the floppy disk drive, short-term random access memory, the data entry device such as the keyboard or mouse pointing devices, and other peripheral devices. On the other hand, computer software is considered to be the programs operating on the computer system that makes it useful. For example, the first program is typically the operating system that allows the computer to assimilate information from the user and provide information back to the user in a user-friendly and intuitive manner. On top of the operating system are application programs that allow a user to perform various tasks. One such task may include word processing, while another task may include accounting and spreadsheets operation. Other tasks may include game operation or video processing in a multimedia environment.

Computer programs' externals or interfaces have simplified dramatically over the years to move away from entering data via the keyboard and hardcoding to using a pointing device, such as a mouse, in a graphical-user interface (GUI) environment. The first well-known GUI environment that has had substantial commercial success even to this day is the Macintosh computer manufactured by Apple Computer Company. Another GUI environment is the Windows environment provided by Microsoft Corporation. The GUI environment has extended even to UNIX and most all computer environments as well.

Significantly, many applications still exist that are character-based and either must be upgraded to a GUI-based version, or converted to a GUI environment, which is quite expensive. One problem with the character-based applications is that there is often much information associated with the features, functions and options—more than can fit on one screen. This is a problem in that the video display or computer screen has a limited amount of area in which to display useful information in character-based mode. Currently, the user must request several screens in order to identify all the useful information relating to the functions and options typically available in a particular program. Further, the user also may remember a particular function being within a selected section of the program, but may not access that section without jumping from five or six different screens until the information is displayed for use. Further, character-based systems seldom support pointer devices and drop-down menus that greatly simplify a user's ability to interface with a complex application. These tools are assets in the GUI world.

Thus, without a mechanism that can perform function and option identification across a plurality of displayed screens for subsequent display in a single graphical panel, a user of character-based applications will never be able to optimize or benefit from all the features, functions, and options typically provided in today's computer applications, unless those are rewritten.

SUMMARY OF THE INVENTION

It is therefore one object of the present invention to provide a data processing system using graphical displays and software.

It is another object of the present invention to provide program information and commands usable by a user in a data processing system upon a graphical display.

It is yet another object of the present invention to provide a method for determining all functions and options available to a user in a character-based computer system and then display them within a single graphical display panel.

According to the present invention, a computer system having a bus, a central-processing unit, a computer system memory, which is connected to the central-processing unit via the bus, a terminal screen buffer, which is stored in the computer system memory, and a screen conversion mechanism, which is also stored in the computer system memory, is disclosed. The terminal screen buffer receives a character-based data stream from a host computer system coupled to the computer system and the screen conversion mechanism identifies all functions available for a character-based application sent within the data screen received by the terminal screen buffer, which character-based application operates on the computer system, and displays the functions in a single graphical panel. Additionally, the screen conversion mechanism further identifies all options available on the character-based program and displays the options in the single graphical panel. The screen conversion mechanism can then generate separate pull-down menus for all of the functions and options.

The screen conversion mechanism typically converts data stream information from a character-based application located on a host computer system coupled to the computer system via a network interface. Additionally, although the screen conversion mechanism is directed towards converting a data stream from a host computer for use on a local computer system, the conversion mechanism can also be implemented on a single computer system that performs all processes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A shows a first screen displayed in a character-based prior art application.

FIG. 3B shows a new screen requested by the user from the host system, illustrating additional options from the screen of FIG. 3A.

FIG. 3C and FIG. 3D depict additional new screens revealing additional function keys that are available to the user.

DETAILED DESCRIPTION OF PREFERRED EMBODIMENT

Figure 1A:
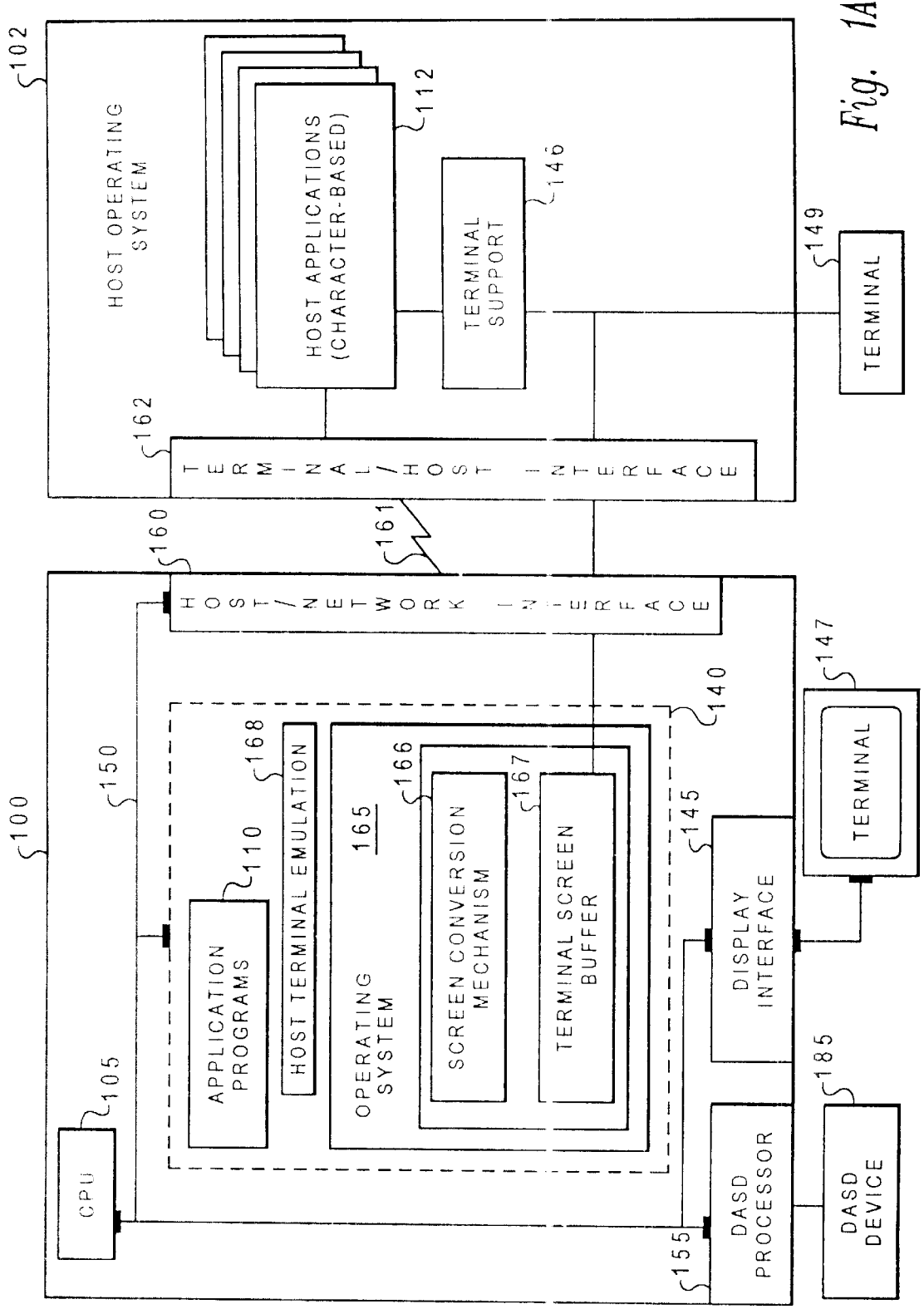
FIG. 1A shows a block diagram of an enhanced computer system according to the present invention.
Figure 1B:
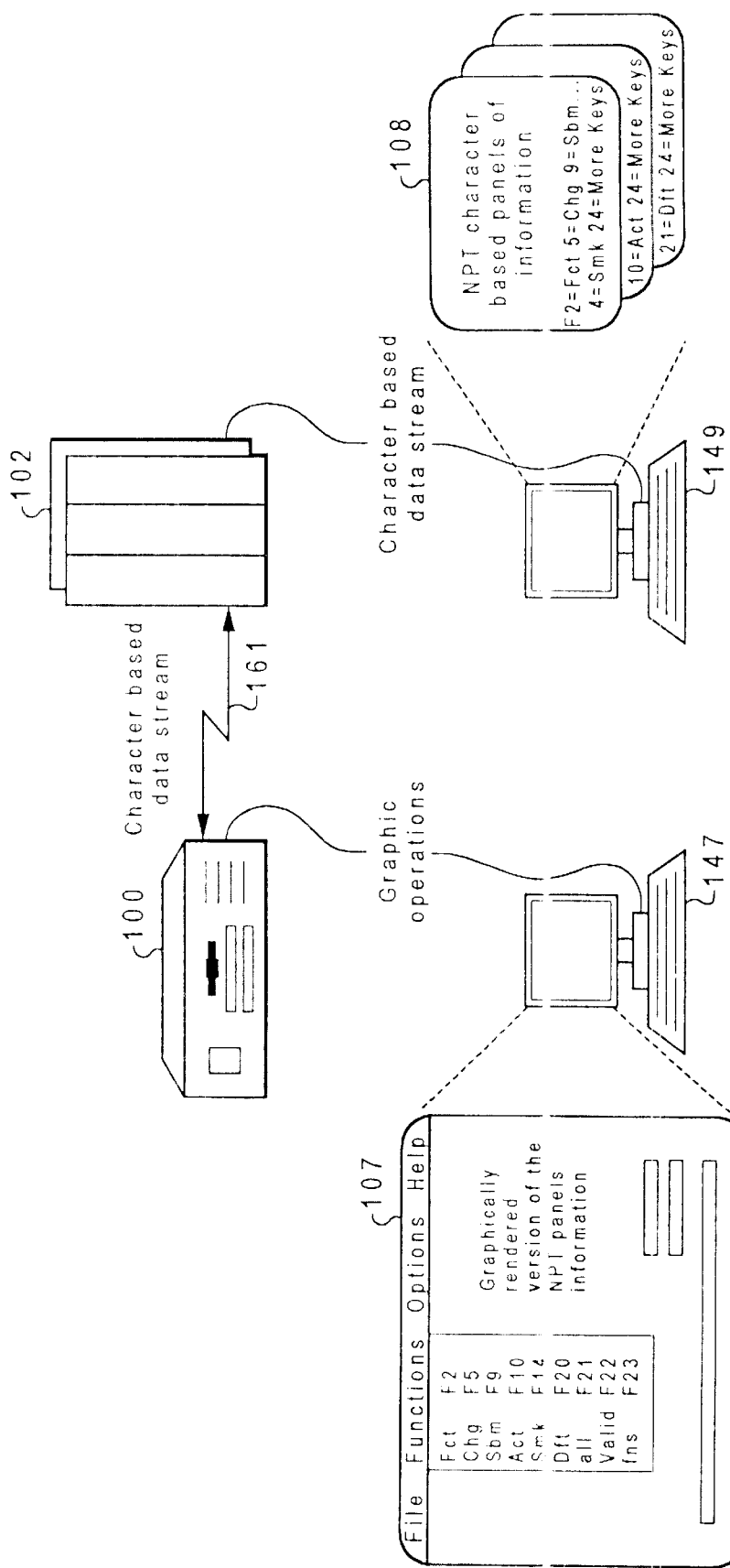
FIG. 1B shows a schematic diagram of the system in FIG. 1A and the screens shown on a character-based terminal and a graphical-based terminal.

FIG. 1, which includes both FIGS. 1A and 1B, shows a block diagram of the computer/host system of the present invention. The computer system of the preferred embodiment is an enhanced IBM AS/400 computer system, which is used as a server or host computer. Those skilled in the art, however, will appreciate that the mechanisms and apparatus of the present invention apply equally to any computer system, regardless of whether the computer system is a complicated multi-user computing apparatus or a single-user work station. As shown in the exploded view of FIG. 1A, computer system 100, which may be either a personal computer or work station, comprises main or central processing unit (CPU) 105 connected to main memory 140, terminal interface 145, mass storage interface 155, and network interface 160. These system components are interconnected through this use of system bus 150. FIG. 1B is a block diagram depicting the schematic connection of host system 102 with computer system 100 as well as sample graphic and character screens 107 and 108, respectively. Although computer system 100 is shown to contain only a single main CPU and a single system bus, it should be understood that the present invention applies equally to computer systems that have multiple CPUs and to computer systems that have multiple busses and that each perform different functions in different ways.

The interfaces (called input/output processors in AS/400 terminology) that are used in the preferred embodiment may each include separate, fully programmed microprocessors that are used to off load computer-intensive processing from CPU 102. Those skilled in the art, however, will appreciate that the present invention applies equally to computer systems that simply use I/O adapters to perform similar functions. Terminal interface 146 is used to connect directly one or more terminals 149, and/or (indirectly via the network interfaces 162, 161, and 160, and the terminal screen buffer 167) graphics capable monitor, to computer systems 100 and 102. Host/network interface 160 is used to connect a server, host, or mainframe computer system 102 to computer system 100 in network fashion. The present invention is not limited to any one networking mechanism. Computer system 100 may be connected to other systems through the use of present-day analog or digital techniques, or both, or via some networking mechanism of the future. Or it may operate stand-alone without any network connections to other computers.

Mass storage interface 155 is used to connect mass storage devices, such as DASD device 185, to computer system 100. A like system is provided in host system 102, but is not represented in the figure. Host system 102 further connects to terminals 149. These terminals 149, which may be non-intelligent (non-programmable terminal (NPT)) or fully programmable work stations, are used to allow system administrators and other users to communicate with computer system 102.

Main memory 140 contains application programs 110 and operating system 165. While application programs 110 and operating system 165 are shown to reside in main memory 140, those skilled in the art will recognize that these entities are shown in this manner to represent the fact that programs are typically loaded from slower mass storage into faster main memory to execute. Depicting these programs in this manner should not be taken to mean that they are necessarily all completely contained in main memory 140 at the same time. It should also be noted that the term computer system memory is used herein to refer generically to the memory of the computer system as a whole (i.e., main memory 140 and that represented by DASD device 185). Those skilled in the art will further recognize that the programs shown in main memory 140 need not necessarily all reside on computer system 100. For example, one or more programs of application programs 110 may reside on another system and engage in cooperative processing with one or more programs that reside on computer system 100. This should be accomplished through the use of one of the well-known client-server mechanisms such as remote procedure call (RPC).

Host mainframe 102 includes similar components as computer 100 such as host applications 112, which typically are loaded in a local fast memory or on quick access long term storage devices. Further included is terminal support 146 that supports character-based applications run by mainframe 102 for display on character-based support terminal 149. Mainframe 102 connects to network interface 160 via terminal/host interface 162.

Operating system 165 is a PC or work station operating system such as Windows by Microsoft or OS/2 by IBM; however, those skilled in the art will appreciate that the spirit and scope of the present invention is not limited to any one operating system. Operating system 165 is further shown to contain character-to-graphic conversion mechanism 166. Conversion mechanism 166 allows users with personal computers or work stations to display a graphical equivalent of a data stream received from a host system via network interface 160 over network transmission means 161. The data stream is a single screen image at a time, but no more than that. The data stream includes user interface or screen information, which is also known as "externals" as opposed to the program itself. For example, if a user wants to see all of the function keys (F keys) or options, or both, that are valid for a given screen, he or she must press an F key (F24 and F23, respectively, for an AS/400 attached host computer) to get the screen to be refreshed to show the next set of values. In many cases, the user must get the next screen, screen after screen, in order to view all of the available functions and options. One type of "screen scraper" program product used in the OS/400 is the Graphical Access program, which reads the terminal screen buffer 167 and then presents a graphical rendering of it on a display screen via display interface 145. Conversion mechanism 166 operates in the PC work station to transform non-programmable terminal (NPT) host data stream into a graphical representation while looking for visual cues that a single host screen actually has multiple versions to carry information for which there is not enough room on a single-host panel. When that is recognized, the technique automatically requests, on behalf of the user—but without the user's knowledge nor interaction, any additional screens from the host in order to capture the missing information and cache it in the PC.

It is important that while the present invention has been, and will continue to be, described in a context of a fully functional computer system, those skilled in the art will appreciate that the present invention is capable of being distributed as a program product via floppy disk, CD ROM, or other form of recordable media or via any type of electronic transmission mechanism, such as a modem.

Figure 2:
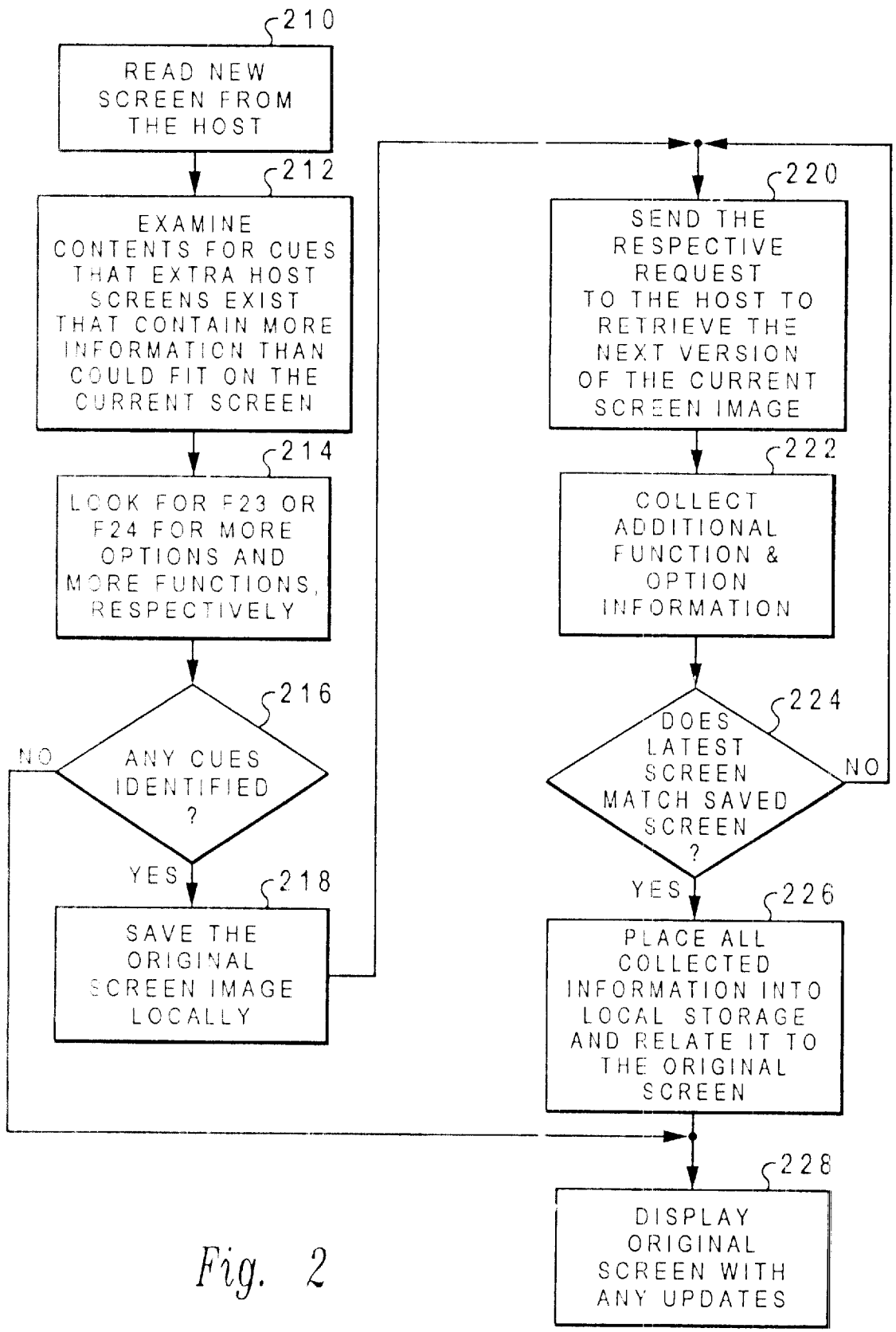
FIG. 2 is a flow diagram depicting the operation of the conversion mechanism shown in FIG. 1.

FIG. 2 is a flow diagram of the portion of conversion mechanism 167. Each time a user requests a function which requires a new screen from a character based application (here we make a distinction that a new screen is different than additional or alternate screens, that distinction to become apparent in further discussion which follows), the mechanism requests that new screen from the application or operating system via block 210. Such a new screen is represented by the front or first screen image of 108 in FIG. 1B.

Before (or while if multiple threads or tasks are used to support this) the new screen is converted to a graphic version, conversion mechanism 167 examines the content of the screen via block 212 for cues that additional information for the 'new' screen exists—in alternate screens. The cues are typically intended only for the user as visual cues. These alternate screens, represented as the second and back screen images of 108 in FIG. 1B are distinguished from a new screen as stated above. Without this submitted technique, the user would be responsible for recognizing the cues, and to request presentation of the (possibly several) alternate screens in order to become aware of the additional information associated with the original ('new') screen. In this case, the additional information is illustrated as additional options and functions available for use by the user, 306 in FIG. 3B, 306 in FIG. 3C, and 304 in FIG. 3D. The visual cues used are the Function key definitions for F23 and F24 respectively, as noted in block 214 and as illustrated by 304 in FIGS. 3A through 3D.

After examination of the new screen for any number of cues, the technique determines if any were detected, as noted in block 216. If no cues were detected, that is, no alternate screens exists for the current screen, the conversion mechanism allows the current 'new' screen to be displayed as converted to its graphical version in block 228. If, however, cues were detected that alternate screens exists, conversion mechanism 167 first saves an image of the current 'new' screen, as in block 218, and then enters a loop to collect the additional information for the user—without requiring the user's interaction or knowledge. To accomplish this, the technique requests the next alternate screen from the application or operating system via block 220, collects and saves locally any additional information, via block 222, and then tests to see if the current screen is equal to the saved ('new') screen or not (is an alternate), as noted in block 224. This is illustrated by the changing additional information on alternate screens in areas 306 and 304 of FIGS. 3A through 3D. The technique will recognize when it has cycled through all of the alternate screens when the next screen matches the original ('new') screen. When that is observed, the technique formats all of the collected additional information in such a way as to relate it to the original ('new') screen, as noted in block 226.

At that time, the technique allows the now modified graphic version of the original ('new') screen to be presented, accompanied by all of the additional information collected from the alternate screens, via block 228. The revised, and now single, graphic version of the screen is represented by 107 in FIG. 1B. Note that the result is that the user does not need to be aware of the alternate screens, does not need to look for the visual cues, nor even think about what they mean and demand. Those cues are now removed because they are unnecessary. The user's interactions and distractions are reduced accordingly. The user now deals only with the graphical version of what we are calling the 'new' screens; unaware that the old, yet unchanged, implementation of the character based application being used even has additional, alternate screens.

Figure 4A:
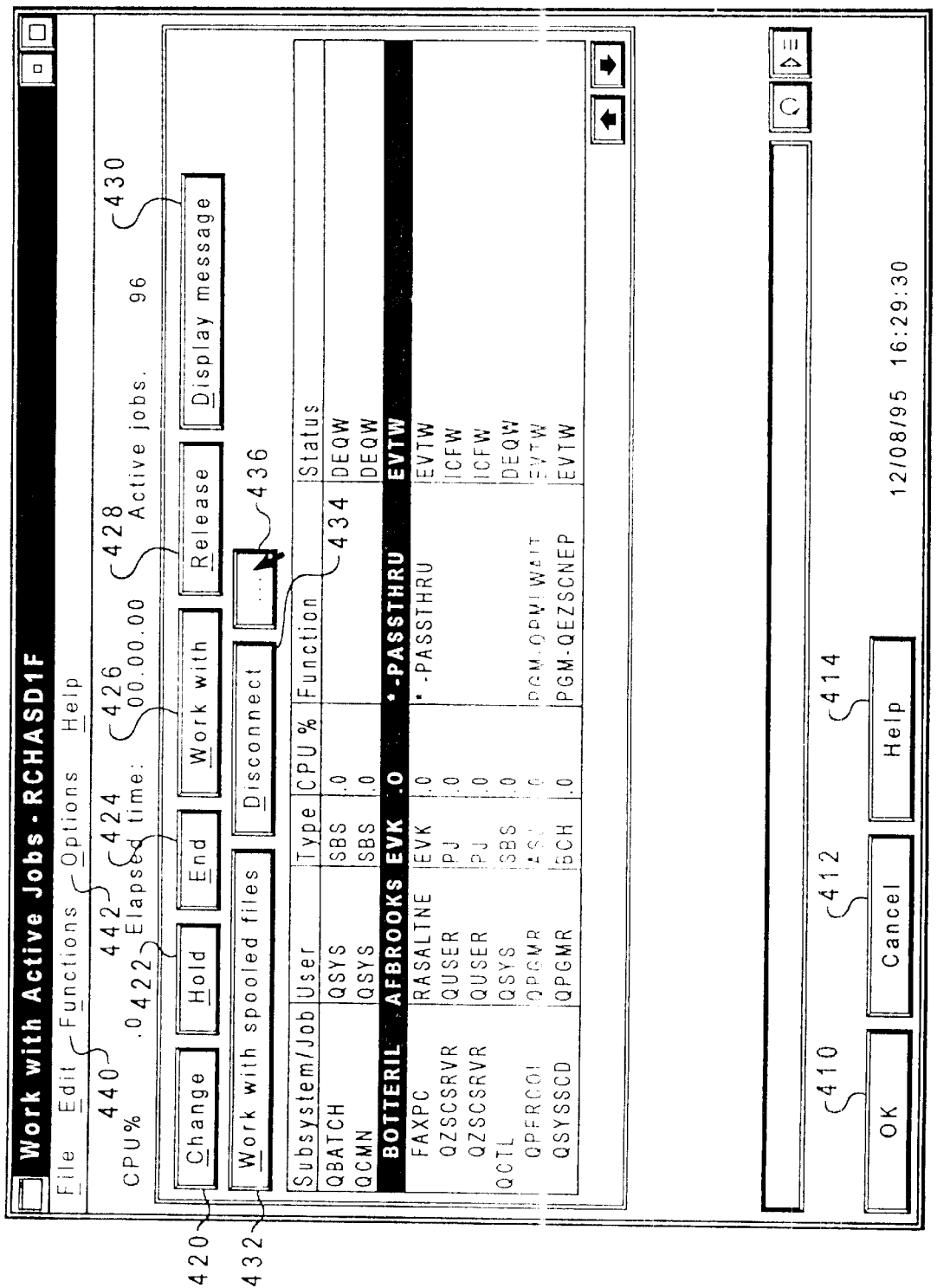
FIG. 4A depicts a graphics panel screen that shows no function-key choices, except for three common navigational functions at the bottom of the screen.
Figure 4B:
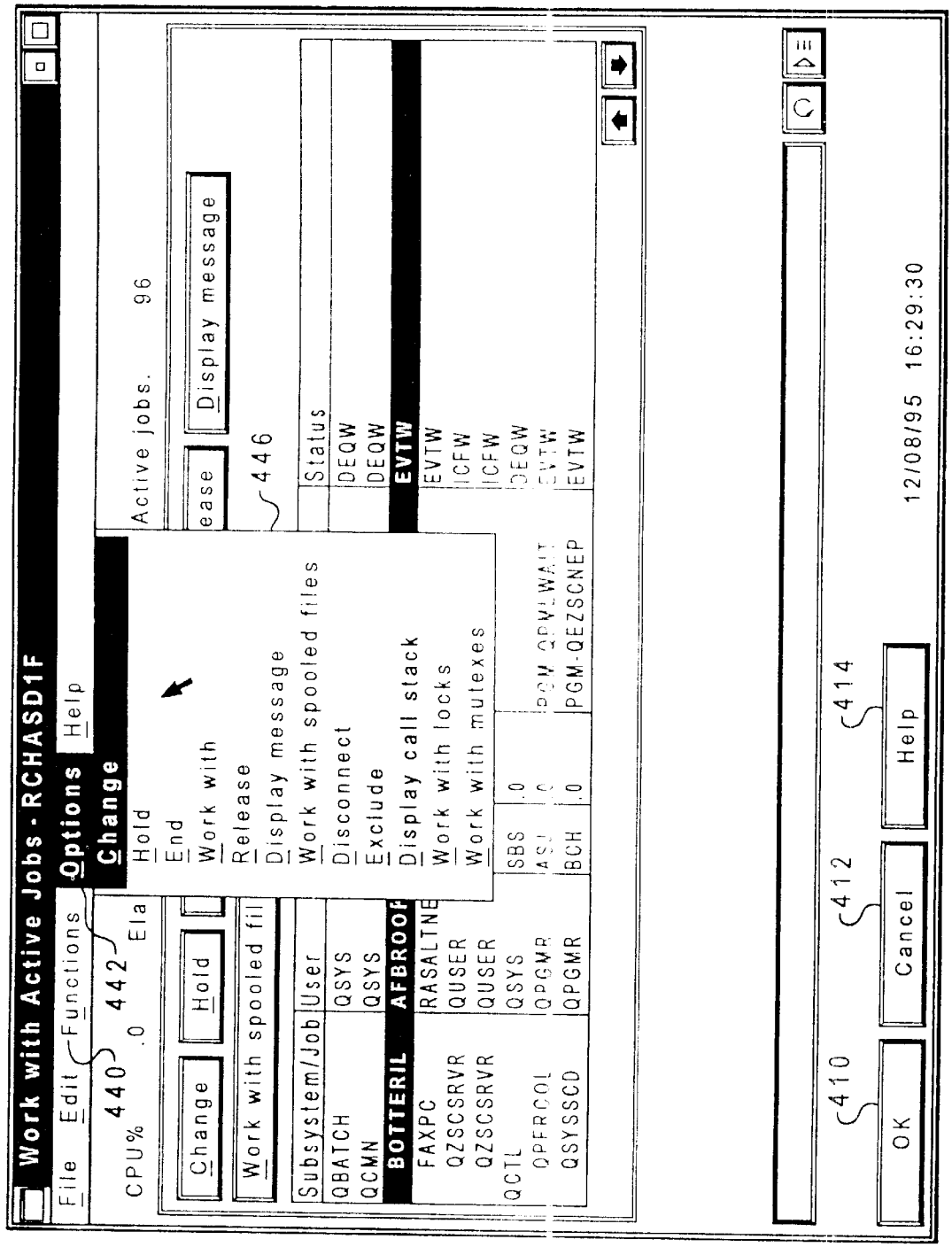
FIG. 4B illustrates the graphical results of a user accessing the options pull-down menu, as shown in FIGS. 3A and 3B, according to the present invention.
Figure 4C:
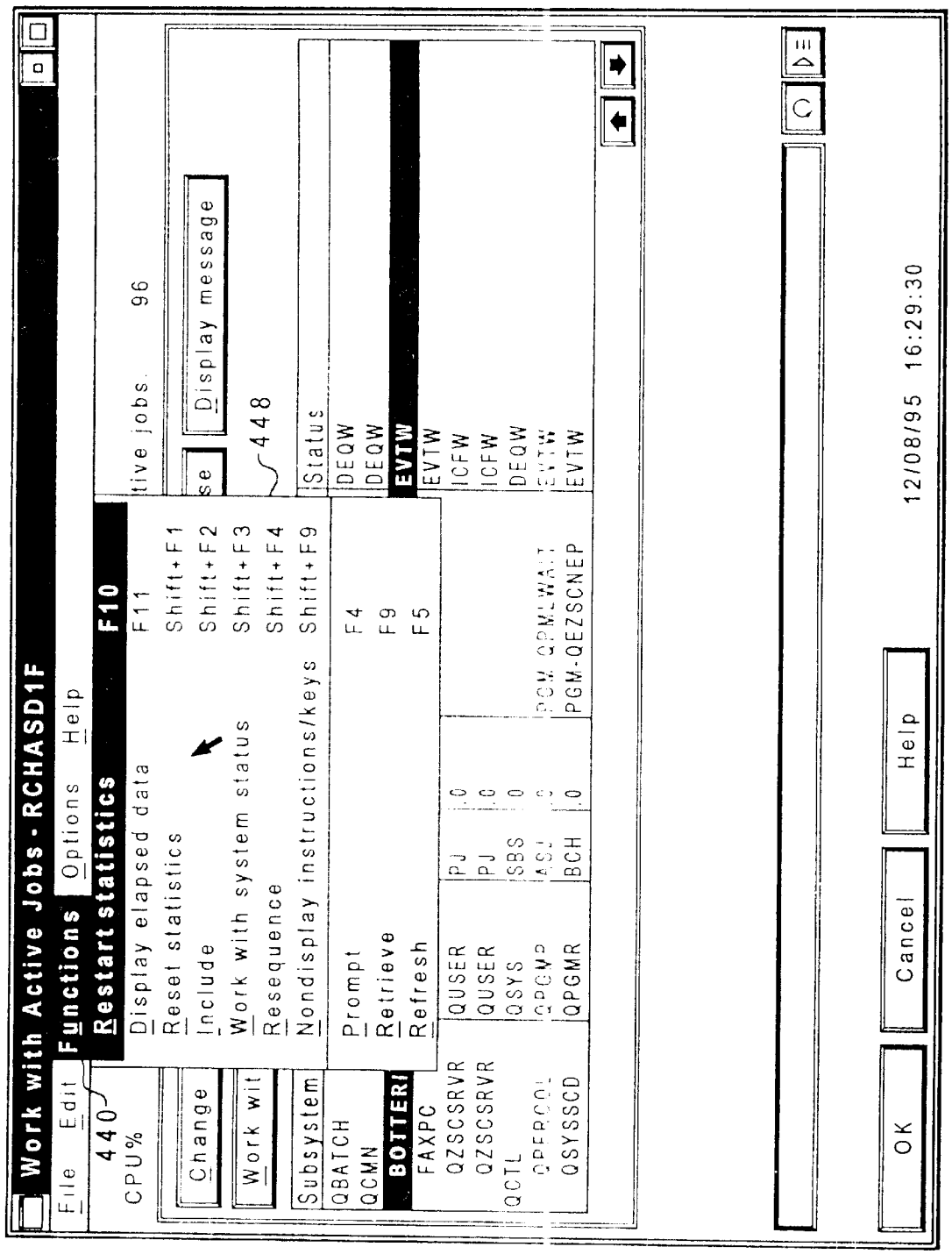
FIG. 4C shows all the functions displayed in a function pull-down menu according to the present invention.

The work station screens, which are graphical-user-interface-oriented (GUI) screens are depicted in the series of screen images shown in FIGS. 4A–C. FIG. 4A is a PC screen that shows no function-key choices, except for three common navigational functions at the bottom of the screen identified as items 410, 412, and 414. These common navigational functions are shown by default, and the screen also shows only the first half of the available options that are identified as change 420, hold 422, and 424, work with 426, release 428, display message 430, work with spooled items 432, disconnect 434, and obtain more options ". . . " 436. But the user may access a functions and options list via Functions menu 440 or Options menu 442.

FIG. 4B illustrates the graphical results of a user accessing the options list 442. The user selects the Options menu 442 which displays the options pull-down menu 446. In this example, we see that all the options previously disclosed in FIGS. 3A–3D are now shown and include the options shown in FIG. 4A as well.

Likewise, when a user selects the function choice 440 in FIG. 4A, all the functions are displayed in a function pull-down menu 448 as shown in FIG. 4C.

Thus, it has been illustrated and disclosed how a user can display a functions or options pull-down menu to access either all the functions or options, or both, typically available in a current application and valid for a current panel without having to scroll through several screens/panels of information which differ only in the subset of functions and options that are shown on the limited display area of the host data screen.

This method of identifying and collecting useful information for display on a single graphical panel may also be conditioned to be invoked at different times, based on the relative performance of the client PC and the host computer. If both the client PC and the host computer use relatively fast central-processing units, the method can be invoked as each new GUI panel is initially requested, making this update and function and option pull-down menu fully automatic. Otherwise, if either the client or the server is not operating at an optimal speed, or if the current network loads prohibit fully automatic use, the method may be invoked either when the user selects one of the pull-down menus, or when the user selects an option at the bottom of either pull-down menu, in order to retrieve more functions or more options, respectively.

Significantly, these improvements to the behavior of interaction with the host computer is done without any changes to the character-based software. Likewise, the changes could actually be implemented in the host computer without making any changes to the client or workstation software. Although the invention has been described with respect to the interaction of a host computer with a main computer system, it should be understood by those skilled in the art that the conversion mechanism can also be implemented on a single computer that performs all processes.

While the invention has been particularly shown and described with reference to a preferred embodiment, it will be understood by those skilled in the art that various changes in form and detail may be made therein without departing from the spirit and scope of the invention.

I claim:

1. A computer system comprising:

a bus;

a central-processing unit;

a computer system memory, said computer system memory being connected to said central-processing unit via said bus; and a screen conversion mechanism, said screen conversion mechanism being stored in said computer system memory, wherein said screen conversion mechanism identifies character-based information for a character-based program operable on said computer system, said screen conversion mechanism operating across a plurality of character-based screen to display at least some of said character-based information from more than one of said character-based screens in a single graphical panel.

2. The computer system of claim 1 wherein said character-based information includes all functions available for said character-based program, which functions are displayed in a single graphical panel.

3. The computer system of claim 1 wherein said character-based information includes all options available on said character-based program, which options are displayed in said single graphical panel.

4. The computer system of claim 1 wherein said screen conversion mechanism generates a pull-down menu containing all of said functions, said pull-down menu being displayable in said single graphical panel.

5. The computer system of claim 1 wherein said screen conversion mechanism generates a pull-down menu containing said information, said pull-down menu being displayable in said single graphical panel.

6. The computer system of claim 1 wherein said character-based program is located on a host computer system coupled to said computer system via a network interface and wherein externals of said character-based program are transmitted as a character-based data stream and converted by said screen conversion mechanism.

7. A computer system comprising:

a bus;

a central-processing unit;

a computer system memory, said computer system memory being connected to said central-processing unit via said bus;

a terminal screen buffer, said terminal screen buffer being stored in said computer system memory, wherein said terminal screen buffer receives a character-based data stream from a host computer system coupled to said computer system; and a screen conversion mechanism, said screen conversion mechanism being stored in said computer system memory, said screen conversion mechanism identifying character-based information for a character-based application sent within said data screen received by said terminal screen buffer, said character-based information comprising a plurality of character-based screens, said character-based application being operable across said plurality of character-based screens to display at least some of said character-based information from more than one of said character-based screens in a single graphical panel.

8. The computer system of claim 7 wherein said character-based information includes all functions available for said character-based program, which functions are displayed in a single graphical panel.

9. The computer system of claim 8 wherein said screen conversion mechanism generates a pull-down menu containing all said functions, said pull-down menu being displayable in said single graphical panel.

10. The computer system of claim 7 wherein said character-based information includes all options available on said character-based program, which options are displayed in said single graphical panel.

11. The computer system of claim 10 wherein said screen conversion mechanism generates a pull-down menu containing all of said options, said pull-down menu being displayable in said single graphical panel.

12. The computer system of claim 7 further comprising:

a host terminal emulator, said host terminal emulator being resident in said computer system memory, wherein said host terminal emulator allows said computer system to emulate said host computer.

13. The computer system of claim 7 wherein said character-based application is located on a host computer system coupled to said computer system via a network interface and wherein externals of said character-based program are transmitted as a character-based data stream for conversion by said screen conversion mechanism.

14. A program product, said program product comprising:

a recordable media; and a screen conversion method recorded on said recordable media, said screen conversion mechanism being used on a computer system to identify character-based information for said character-based application, said character-based information comprising information about a plurality of character-based screens, said screen conversion mechanism being used to display at least some of said character-based information from more than one of said character-based screens in a single graphical panel.

15. The program product of claim 14 wherein said information includes all functions available on said character-based program, said screen conversion method then requests display of all said functions in said single graphical panel.

16. The program product of claim 15 wherein said screen conversion method is being used to generate a pull-down menu containing all of said functions, said pull-down menu being displayable in said single graphical panel.

17. The program product of claim 14 wherein said information includes all options available on said character-based program, said screen conversion method is being used to display said options in said single graphical panel.

18. The program product of claim 17 wherein said screen conversion method is being used to generate a pull-down menu containing all of said options, said pull-down menu being displayable in said single graphical panel.

19. The program product of claim 14 wherein said character-based application is located on a host computer system coupled to said computer system via a network interface and wherein externals of said character-based program are transmitted as a character-based data stream for conversion by said screen conversion method.

20. A program product comprising:

a recordable media; and a terminal screen buffer, said terminal screen buffer being used on a computer system, said terminal screen buffer being used to receive a character-based data stream from a host computer system coupled to said computer system; and a screen conversion method, said screen conversion method being used on said computer system to identify character-based information available for a character-based application sent within said data stream received by said terminal screen buffer, said character-based application being operable on said computer system, said screen conversion mechanism being used to display at least some of character-based information from more than one of said character-based screens in a single graphical panel, to display at least some of said character-based information from more than one of said character-based screens in a single graphical panel.

21. The program product of claim 20 wherein said information includes all functions available on said character-based program, said screen conversion method is being used to display said functions in said single graphical panel.

22. The program product of claim 21 wherein said screen conversion method is being used to generate a pull-down menu containing all of said functions, said pull-down menu being displayable in said single graphical panel.

23. The program product of claim 20 wherein said information includes all options available on said character-based program, said screen conversion method is being used to identify all options, said screen conversion method is being used to display said options in said single graphical panel.

24. The program product of claim 23 wherein said screen conversion method is being used to generate a pull-down menu containing all of said functions all of said options, said pull-down menu being displayable in said single graphical panel.

25. The program product of claim 20 wherein said character-based application is located on a host computer system coupled to said computer system via a network interface, said program being transmitted as a character-based data stream for conversion by said screen conversion method.

26. The program product of claim 20 further comprising:

a host terminal emulator, said host terminal emulator being used on said computer system to emulate said host computer.

27. A method for converting character-based screen information from at least one screen and possibly several screens into a single graphical-based window, said method comprising the computer implemented steps of:

identifying said character-based information related to a character-based application operable on a computer system;

representing said character-based information as graphical-based screen information; and displaying said identified character-based information in a single graphical panel based on said graphical-based screen, said character-based information being from more than one character-based screen.

28. The method of claim 27 wherein said information includes all functions available on said character-based application, said displaying s being used to display said functions in said single graphical panel.

29. The method of claim 28 wherein said displaying step further includes the step of generating a pull-down menu containing all of said functions, said pull-down menu being displayable in said single graphical panel.

30. The method of claim 27 wherein said information includes all options available on said character-based application, said screen conversion method is being used to identify all options, said screen conversion method is being used to display said options in said single graphical panel.

31. The method of claim 30 wherein said displaying step further includes the step of generating a pull-down menu containing all of said options, said pull-down menu being displayable in said single graphical panel.

32. A method for transmitting a program's externals from a first computer system to a second computer system, said method comprising the steps of:

establishing a connection between said first computer system and said second computer system; and transmitting said program's externals from said first computer system to said second computer system, said second computer system containing a screen conversion method, said screen conversion method being used on a computer system to identify character-based information for said character-based application, said screen conversion method being used to display at least some of said character-based information from more than one of said character-based screens in a single graphical panel.

* * * * *

UNITED STATES PATENT AND TRADEMARK OFFICE
CERTIFICATE OF CORRECTION

PATENT NO.    :   5,831,607
DATED         :   November 3, 1998
INVENTOR(S)   :   Arthur Phillip Brooks It is certified that error appears in the above-identified patent and that said Letters Patent is hereby corrected as shown below:

Claim 20, Col. 9, Lines 14-17, "to display at least some of character-based information from more than one of said character-based screens in a single graphical panel," should be deleted.

Claim 28, Col. 10, Line 16, "s" should be --step--.

Signed and Sealed this

Thirteenth Day of April, 1999

Attest:

Q. TODD DICKINSON

*Attesting Officer*       *Acting Commissioner of Patents and Trademarks*

UNITED STATES PATENT AND TRADEMARK OFFICE
CERTIFICATE OF CORRECTION

| | |
|---|---|
| PATENT NO. | : 5,831,607 |
| APPLICATION NO. | : 08/591845 |
| DATED | : November 3, 1998 |
| INVENTOR(S) | : Arthur Phillip Brooks |

Page 1 of 1

It is certified that error appears in the above-identified patent and that said Letters Patent is hereby corrected as shown below:

Column 7 line 24, please change "character-based screen" to "character-based screens"

Signed and Sealed this

Sixteenth Day of March, 2010

David J. Kappos
*Director of the United States Patent and Trademark Office*